US012483822B2

(12) United States Patent
Greenwood et al.

(10) Patent No.: US 12,483,822 B2
(45) Date of Patent: Nov. 25, 2025

(54) METHOD AND SYSTEM FOR ESTIMATING ENVIRONMENTAL NOISE ATTENUATION

(71) Applicant: Apple Inc., Cupertino, CA (US)

(72) Inventors: Andrew E. Greenwood, San Francisco, CA (US); Ian M. Fisch, Santa Cruz, CA (US); Tyrone T. Chen, San Jose, CA (US); Nicholas D. Felton, Cupertino, CA (US); Mary-Ann Rau, San Francisco, CA (US); Kevin M. Lynch, Woodside, CA (US)

(73) Assignee: Apple Inc., Cupertino, CA (US)

( * ) Notice: Subject to any disclaimer, the term of this patent is extended or adjusted under 35 U.S.C. 154(b) by 209 days.

(21) Appl. No.: 18/317,872

(22) Filed: May 15, 2023

(65) Prior Publication Data

US 2023/0370765 A1 Nov. 16, 2023

Related U.S. Application Data

(60) Provisional application No. 63/342,561, filed on May 16, 2022.

(51) Int. Cl.
*H04R 1/10* (2006.01)

(52) U.S. Cl.
CPC .................................. *H04R 1/1083* (2013.01)

(58) Field of Classification Search
CPC ........................... H04R 1/1083; H04R 1/1041; H04R 2210/10; G10K 2210/108; G10K 2210/1081; G10K 2210/1082
See application file for complete search history.

(56) References Cited

U.S. PATENT DOCUMENTS

| | | | | |
|---|---|---|---|---|
| 11,153,677 | B2 | 10/2021 | Woodruff et al. | |
| 11,215,500 | B2 | 1/2022 | Mazur et al. | |
| 11,355,096 | B1 | 6/2022 | Gandhi | |
| 11,818,554 | B2 * | 11/2023 | Mazur | G06F 16/636 |
| 2020/0379718 | A1 * | 12/2020 | Mazur | G01H 3/14 |
| 2024/0050279 | A1 * | 2/2024 | Hamer | G10K 11/17873 |

OTHER PUBLICATIONS

Etymotic, "Music Pro Elite", received from https://www.etymotic.com/product/music-pro-elite/, Jan. 21, 2022, 5 pages.

* cited by examiner

*Primary Examiner* — Ping Lee
(74) *Attorney, Agent, or Firm* — Aikin & Gallant, LLP

(57) ABSTRACT

A method that includes determining a level of sound within an acoustic environment captured by a microphone; receiving, from a headset worn by a user, data indicating an audio processing mode in which the headset is operating; determining a level of attenuation of the sound based on the audio processing mode and the level of sound; estimating sound exposure based on at least the level of attenuation and the level of sound; and transmitting the sound exposure to an application program.

20 Claims, 6 Drawing Sheets

METHOD AND SYSTEM FOR ESTIMATING ENVIRONMENTAL NOISE ATTENUATION

CROSS-REFERENCE TO RELATED APPLICATION

This application claims the benefit of and priority to U.S. Provisional Patent Application No. 63/342,561, filed May 16, 2022, which is hereby incorporated by this reference in its entirety.

FIELD

An aspect of the disclosure relates to a system that determines a user's noise exposure to an acoustic environment by estimating environmental noise attenuation of a user's headset. Other aspects are also described.

BACKGROUND

Headphones are an audio device that includes a pair of speakers, each of which is placed on top of a user's ear when the headphones are worn on or around the user's head. Similar to headphones, earphones (or in-ear headphones) are two separate audio devices, each having a speaker that is inserted into the user's ear. Both headphones and earphones are normally wired to a separate playback device, such as an MP3 player, that drives each of the speakers of the devices with an audio signal in order to produce sound (e.g., music). Headphones and earphones provide a convenient method by which the user can individually listen to audio content without having to broadcast the audio content to others who are nearby.

SUMMARY

An aspect of the disclosure is a method performed by an electronic device (e.g., a user's companion device, such as a smart phone or a smart watch) that is communicatively coupled with an audio output device, such as a headset that is being worn by (on a head of) a user. Specifically, at least a portion of the operations described herein may be performed while the user is wearing the headset on the user's head and has (or is using) the electronic device, which may be held and/or worn by the user, such as wearing a smart watch on the user's wrist. The electronic device determines a level of sound (e.g., noise) within an acoustic environment captured by a microphone. In this case, the electronic device may include the microphone, which is arranged to capture ambient sound from the ambient environment (e.g., in which the electronic device is located) as a microphone signal. The device may determine the level of sound (e.g., sound pressure level (SPL)) of the (e.g., sound captured in the) microphone signal.

The electronic device receives, from the headset being worn by the user, data indicating an audio processing mode in which the headset is operating. In particular, the mode in which the headset is operating may at least partially (passively and/or actively) attenuate noise (e.g., sound sources and/or diffuse sounds) from within the environment. For example, the headset may operate in one mode in which the headset performs an acoustic noise cancellation (ANC) function such that one or more speakers of the headset produces anti-noise. As another example, the headset may operate in a mode in which the headset performs a "pass-through" (or transparency) function in which the headset passes through one or more sounds from within the acoustic environment using the speakers. In particular, the headset may pass through a sound by using the speakers to produce a reproduction of the sound (e.g., such that the user perceives the sound as if the user were not wearing the headset). While operating in at least some of these modes, the headset may attenuate at least some environmental noise that is perceived by the user (or would otherwise be perceived by the user if not wearing the headset). The device determines a level of attenuation of the sound (e.g., environmental noise) based on the audio processing mode and the level of sound. Specifically, the device estimates the level of attenuation applied by the headset while operating in a (current) mode (e.g., an ANC mode, a transparency mode, etc.) when the headset is experiencing environmental noise (within the acoustic environment) at the determined sound level. The device estimates sound exposure of the user based on at least the level of attenuation and the level of sound. For instance, the device may determine a difference between the level of attenuation and the level of sound.

The device transmits the sound exposure, which may include an in-ear sound pressure level (SPL) value (e.g., in dB), to an application program. For instance, the application may be an acoustic dosimetry application that is being (or may be) executed by the electronic device, where the application is configured to display a notification based on the sound exposure on a display of the device. In one aspect, the notification may include the in-ear SPL value.

In one aspect, the level of attenuation is determined in response to determining that the headset is in wireless communication with an electronic device and in response to determining that the headset is operating in the mode based on the received data, and transmitting the sound exposure comprises transmitting, over a wireless communication link, the sound exposure to the electronic device on which the application is being executed. In another aspect, the level of sound is a first level of sound and the level of attenuation is a first level of attenuation, where the device determines a second level of sound within the ambient environment captured by the microphone; and determines a second level of attenuation based on the mode and the second level of sound, wherein the second level of attenuation is different than the first level of attenuation.

Another aspect of the disclosure is a method performed by an electronic device that is communicatively coupled with a headset that is being worn by a user. The device receives, from a headset, a microphone signal captured by a microphone of the headset. The device estimates a level of attenuation associated with an audio processing mode in which the headset is operating based on the microphone signal. The device determines a headset noise exposure by the user based on the estimated level of attenuation, and displays a notification on a display of the device indicating the headset noise exposure by the user.

According to another aspect of the disclosure, a headset includes a microphone; at least one processor; and memory having instructions stored therein which when executed by the at least one processor causes the headset to: determine a noise level of noise within an acoustic environment captured by the microphone; determine a headset noise exposure by a user of the headset based on an audio processing mode in which the headset is operating and the noise level; and cause the headset to transmit the headset noise exposure to an application.

In one aspect, the memory includes further instructions to determine a level of attenuation of the noise due to the headset operating in the audio processing mode, the headset noise exposure is based on at least the level of attenuation and the noise level. In another aspect, the audio processing mode is an active noise cancellation (ANC) mode in which one or more speakers of the headset is producing anti-noise, wherein the level of attenuation is based on an indication that the ANC mode is being performed by the headset, or a pass-through mode in which the headset passes through a sound from within the acoustic environment using one or more speakers, wherein the level of attenuation is based on an indication that the pass-through mode is being performed by the headset.

In one aspect, the audio processing mode is a passive attenuation mode in which neither an acoustic noise cancellation (ANC) function in which anti-noise is played back through one or more speakers of the headset nor a pass-through function in which one or more sounds of the environment are played back through the one or more speakers, are performed by the headset. In another aspect, the headset noise exposure is transmitted over a wireless connection to an electronic device on which the application is being executed. In some aspects, the electronic device is either a smart watch or a smart phone, which is configured to display a notification indicating the headset noise exposure on a display.

In one aspect, the memory has further instructions to: retrieve, from memory of the headset, one or more headset noise exposures that were previously determined over a period of time; and produce an average headset noise exposure using the headset noise exposure and the retrieved one or more headset noise exposures. The average headset noise exposure is transmitted to the application. In another aspect, determining the headset noise exposure comprises determining an in-ear noise level based on a difference between the noise level and a level of attenuation of the headset due to the audio processing mode, wherein the memory comprises further instructions to play back audio content at a sound output level through one or more speakers of the headset, the headset noise exposure comprises a combination of the sound output level and the in-ear noise level.

The above summary does not include an exhaustive list of all aspects of the disclosure. It is contemplated that the disclosure includes all systems and methods that can be practiced from all suitable combinations of the various aspects summarized above, as well as those disclosed in the Detailed Description below and particularly pointed out in the claims. Such combinations may have particular advantages not specifically recited in the above summary.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect.

DETAILED DESCRIPTION

Figure 1:
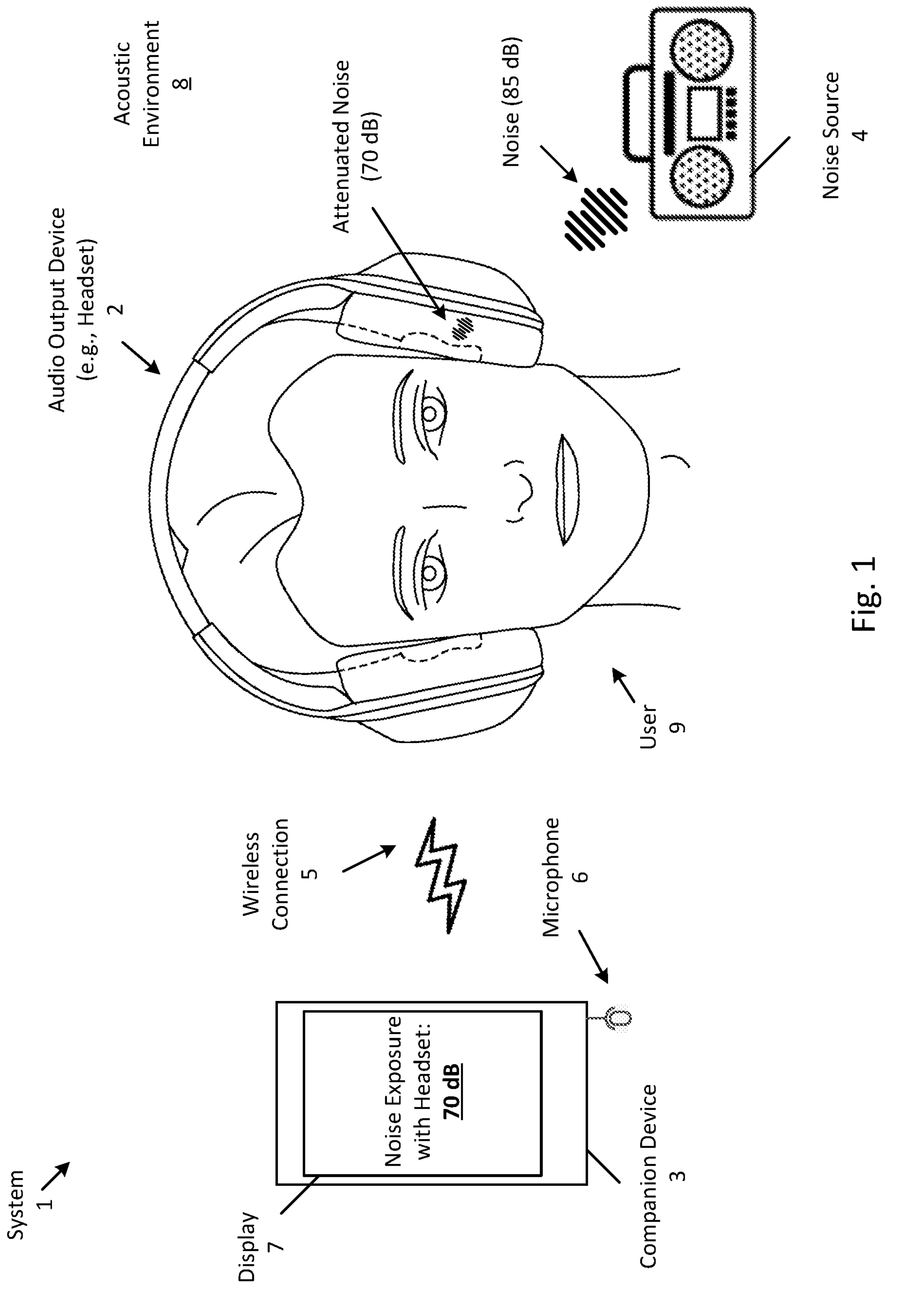
FIG. 1 shows an example of a system that estimates environmental noise attenuation by an audio output device that is worn by a user, and displays the user's noise (sound) exposure that is determined based on the attenuation estimate according to one aspect.

Several aspects of the disclosure with reference to the appended drawings are now explained. Whenever the shapes, relative positions and other aspects of the parts described in a given aspect are not explicitly defined, the scope of the disclosure here is not limited only to the parts shown, which are meant merely for the purpose of illustration. Also, while numerous details are set forth, it is understood that some aspects may be practiced without these details. In other instances, well-known circuits, structures, and techniques have not been shown in detail so as not to obscure the understanding of this description. Furthermore, unless the meaning is clearly to the contrary, all ranges set forth herein are deemed to be inclusive of each range's endpoints.

Acoustic dosimetry may be a process of the measuring audio (noise) exposure over a period of time (e.g., an hour, a day, a week, a month, etc.) in order to provide a cumulative audio-exposure reading (e.g., a sound pressure level (SPL) value). Specifically, acoustic dosimetry may relate to measuring a listener's exposure to environmental noise (e.g., sound that the user is exposed to while attending an outdoor concert). To measure environmental noises, an electronic device (e.g., a SPL meter) captures the noises (e.g., using a microphone) that are within a close proximity to a listener, and outputs a SPL reading (e.g., displaying the reading on a display screen of the SPL meter).

Extended periods of exposure to loud sounds have been shown to cause hearing loss (e.g., noise-induced hearing loss (NIHL)). NIHL is attributed to damage to microscopic hair cells inside the inner ear due to loud sound exposure. For instance, extended exposure to sounds at or above 85 dB may cause temporary or permanent hearing loss in one or both ears. Therefore, some organizations (e.g., the National Institute for Occupational Safety and health (NIOSH) has recommended that worker exposure to ambient noise be controlled below a level equivalent to 85 dB for eight hours to minimize occupational NIHL.

Electronic headsets have become increasingly popular with users because they reproduce media such as music, podcasts, and movie soundtracks, etc., with high fidelity while at the same time not disturbing others who are nearby. Headsets may also attenuate (reduce) a user's exposure to environmental noise. For example, physical features of a headset are often designed to passively attenuate ambient or outside sounds (or noises) that would otherwise be heard by the user (or wearer) of the headset if the user were not to wear the headset. Some headsets attenuate the ambient sound significantly, by for example, being "closed" against the wearer's head or outer ear, or by being acoustically sealed against the wearer's ear canal. Others may attenuate only mildly, such as loose fitting in-ear headphones (or earbuds). Some headsets may actively attenuate environmental noise through the use of audio signal processing operations, such as performing acoustic noise cancellation (ANC).

Some acoustic dosimetry devices may measure environmental noise within an acoustic environment in order to monitor and keep track of a user's environmental noise exposure. If, however, the user was to wear a headset that (passively and/or actively) attenuates the environmental noise, the dosimetry devices may inaccurately estimate the user's actual noise exposure, since the headset may reduce the user's perceived environmental noise exposure. In particular, the actual noise exposure (e.g., the "in-ear" or "headset" noise exposure) by the user (of which the user perceives) may be less than the environmental noise within the acoustic environment in which the user is located. Therefore, there is a need for a system that estimates (a headset's) attenuation of environmental noise in order to accurately determine and monitor a user's actual in-ear noise exposure.

To overcome these deficiencies, the present disclosure describes a system that is capable of determining a user's actual (in-ear or headset) noise exposure (e.g., as a SPL value) based on an estimate of environmental noise attenuation caused by (or the result of) the user's headset. This allows an acoustic dosimetry process that is performed by a system 1 to accurately monitor the user's noise exposure. For example, by estimating the environmental noise attenuation due to (e.g., passive and/or active attenuation of) the user's headset, the dosimetry process may accurately present a notification (or alert), indicating an accurate noise exposure reading that may be (e.g., a SPL value that is) less than (or approximately) the exposure of the noise within the environment (e.g., if the user were not wearing the headset).

FIG. 1 shows an example of such a system 1 that estimates environmental noise attenuation by an audio output device that is worn by a user, and that displays the user's (headset) noise (sound) exposure that is determined based on the attenuation estimate according to one aspect. In particular, this figure shows a user 9 who is wearing an audio output device (e.g., headset) 2, while in an acoustic (or ambient) environment 8 that has (at least one) noise source 4. As shown, the noise source is a music playback device that is playing back one or more sounds (as noise) having a noise (exposure) level of 85 dB. For example, the acoustic environment 8 may be a location, such as an outdoor concert, where music is being played back at a stage, and where the sound level of the music is the environmental noise exposure next to (or within a proximity of) the user. Although illustrated as a playback device, the noise source may be any type of sound source within the environment (e.g., which may or may not be of interest to the user), such as other people talking, environmental noise (e.g., street noise, dogs barking), wind noise, and/or sounds being produced by one or more speakers of other electronic devices (e.g., sound of a television, etc.).

As shown, the headset is an over-the-ear headset that (at least partially) covers the user's ears and is arranged to direct sound into the ears of the user, while the headset is being worn on the user's head. In one aspect, the headset 2 may be a noise cancelling headset that actively attenuates environmental noise (e.g., through performance of an ANC process) by producing anti-noise through one or more speakers. As a result of the headset's passive and/or active attenuation, the headset (or in-ear) noise exposure perceived by the user is attenuated noise having a noise level of 70 dB, which is 15 dB less than that of the noise of 85 dB within the acoustic environment 8.

As described herein, the system is configured to estimate the level of environmental noise attenuation due to the headset in order to determine the user's headset noise exposure. As used herein, "headset noise exposure" may refer to a (e.g., in-ear) noise level at (or near) the user's ear (e.g., as perceived by the user) while wearing the headset and/or an amount of sound played back to the user via the headset speaker(s) such as play back of music and/or speech. For example, the headset noise exposure may be a combined sound level of the in-ear noise level and the sound playback level. In one aspect, the headset noise exposure may be a noise level that is less than an environmental noise level of the acoustic environment in which the user is located. For example, the companion device 3, which may be any electronic device that is capable of performing audio signal processing operations (e.g., a smart phone, a smart watch, etc.) may determine the headset noise exposure for acoustic dosimetry purposes, as described herein.

In particular, the companion device may capture the noise from the acoustic environment 8 ("environmental noise level") using a microphone 6 to determine the level of the noise (e.g., based on a microphone signal produced by the microphone 6), as 85 dB. As used herein, the environmental noise level may refer to the sound (loudness) within the environment that a user would naturally perceive without a head-worn device that would otherwise passively and/or actively perform sound attenuation. The companion device may receive data from the headset 2, via a wireless connection 5 (e.g., BLUETOOTH connection), indicating an audio processing mode in which the headset is operating. For instance, the data may indicate that the headset is performing an ANC function. In another aspect, the data may indicate device characteristics (parameters) of the headset (e.g., a make and model of the headset, whether the headset is in-ear, on-ear, over-ear, etc.).

The device may determine (estimate) a level of attenuation (e.g., 15 dB) of the noise based on the received data and the measured level of the noise (produced by the noise source 4). As used herein, a "level of attenuation" may refer to the amount of passive and/or active attenuation performed by the audio output device 2 while being worn by the user. With the estimated attenuation, the device may determine the headset noise exposure perceived by the user as 70 dB (or dBA) based on the level of attenuation and the measured noise level, and may transmit the sound exposure to an application program. In this case, the application program may be an acoustic dosimetry application that displays the exposure on a display 7 of the companion device 3 as "Noise Exposure with Headset: 70 dB". In one aspect, the acoustic dosimetry application may also display the environmental noise exposure to the user (as 85 dB), for the user's reference, for example. More about the acoustic dosimetry application is described herein.

Figure 2:
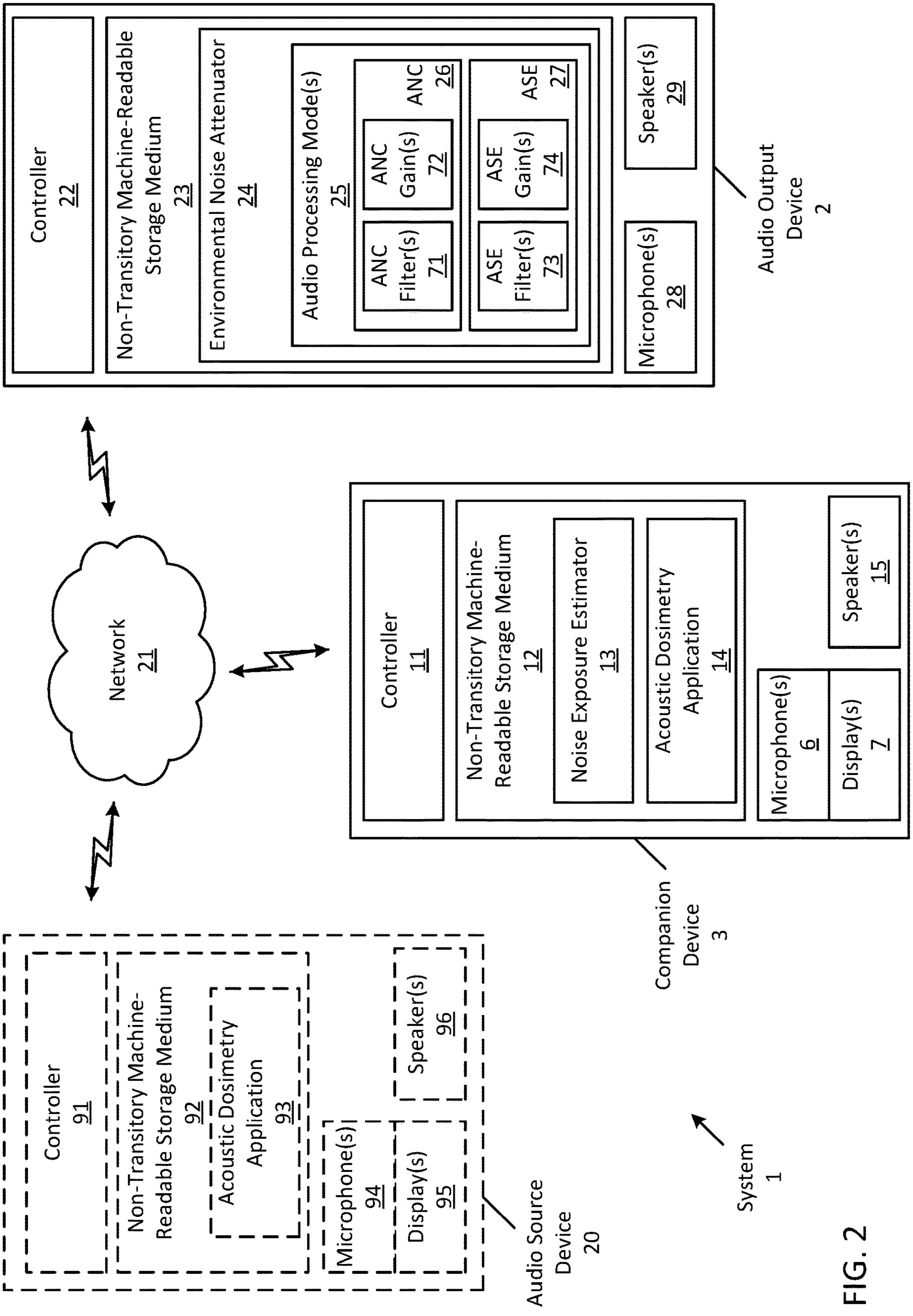
FIG. 2 shows a block diagram of the system that includes the audio output device, the companion device, and an (optional) audio source device, and that estimates environmental noise attenuation according to one aspect.

FIG. 2 shows a block diagram of the system 1 that includes the audio output device 2, the companion device 3, and an audio source device 20 (shown with dashed lines representing that the device is optional), and that estimates environmental noise attenuation according to one aspect. As shown, each of the devices is communicatively coupled to one another via a (computer) network 21. In one aspect, the devices may be wirelessly coupled via one or more wireless connections (e.g., connection 5, as shown in FIG. 1) via one or more networks. For example, at least two of the devices may communicatively couple via any network such as a wirelessly local area network (WLAN), a wireless personal area network (WPAN) (e.g., using BLUETOOTH protocol or any wireless protocol), a wide area network (WAN), a cellular network, etc., in order to exchange digital (e.g., audio) data, using data packets (e.g., Internet Protocol (IP) packets). With respect to the cellular network, the devices may be configured to establish a wireless (e.g., cellular) call, in which the cellular network may include one or more cell towers, which may be part of a communication network (e.g., a 4G Long Term Evolution (LTE) network) that supports data transmission for electronic devices, such as mobile devices (e.g., smartphones).

As described herein, the devices may be communicatively coupled to each other via the network 21. In another aspect, at least one of the devices may be coupled to the other devices and/or may couple the other two devices together. For example, both the companion device 3 and the audio output device 2 may couple to the audio source device 20. In particular, the devices may pair with the audio source device, which may then transit (e.g., controlling) data to either of the devices. In which case, the audio output device and the companion device may exchange data via the audio source device.

As described thus far, the devices may be wirelessly coupled to one another. In another aspect, at least some of the devices may be communicatively coupled via other methods. For example, the audio output device and the audio source device may couple via a wired connection. In this case, one end of a wired connection may be (e.g., fixedly) connected to the output device, while another end may have a connector, such as a media jack or a universal serial bus (USB) connector, which plugs into a socket of the source device. In which case, both devices may exchange data via the wired connection, such as the audio source device transmitting audio signals as digital audio (e.g., PCM digital audio) to the audio output device for playback.

As shown in FIG. 1, the audio output device may be over-the-ear headphones. In some aspects, the audio output device 2 may be any type of head-worn device that is capable of processing audio signal processing operations and/or playback (e.g., user-desired) audio content, such as a musical composition and a motion picture soundtrack. For example, the output device may be in-ear headphones (or earbuds) that are designed to be positioned on (or in) a user's 'ears, and are designed to output sound into the user's ear canal. In some aspects, the in-ear headphones may be a sealing type that has a flexible ear tip that serves to acoustically seal off the entrance of the user's ear canal from an ambient environment by blocking or occluding in the ear canal. As another example, the output device may be on-ear headphones that at least partially cover the user's ears. In another aspect, the output device may be any type of head-worn device with speakers, such as smart glasses.

In some aspects, the audio output device may be a head-worn device, as described herein. In another aspect, the audio output device may be any electronic device that is arranged to output sound into an ambient environment. Examples may include a stand-alone speaker, a smart speaker, a (e.g., part of a) home theater system, or an infotainment system that is integrated within a vehicle.

In one aspect, the companion device and the optional audio source device 20 may be any type of electronic devices that are capable of being communicatively coupled to one or more electronic devices and is configured to perform digital signal (e.g., audio) processing operations. In one aspect, the device 3 is a "companion" device in that it may be capable of being communicatively coupled with the audio output device and may be a portable device with which the user may have (carry and/or wear) on their person. For example, the companion device may be a laptop computer, a digital media player, etc. Other examples include a tablet computer, a smart phone, etc. In another aspect, the companion device may be a wearable device (e.g., a device that is designed to be worn by (and on) the user), such as smart glasses, a smart watch, etc. In some aspects, the companion device may be a desktop computer and/or any other type of electronic device that is capable of performing computational operations.

In one aspect, the source device may be any type of electronic device, such as one of the devices described herein (e.g., a desktop computer). For example, the audio source device may be a smart phone, the companion device may be a smart watch, and the audio output device may be an in-ear, on-ear, or over-the-ear headset, as described herein. In one aspect, the audio output device may be configured to stream audio content (e.g., from local memory and/or from a remote source via the Internet) through the audio source device. Specifically, the source device may provide one or more audio signals that may include user-desired audio content (e.g., musical compositions, etc.) to the audio output device, which may use the signals to drive one or more speakers to playback the audio content.

In some aspects, the devices may be distinct (separate) electronic devices, as shown herein. In another aspect, one of the devices (e.g., the audio output device) may be a part of (or integrated with) another device (e.g., the audio source device). In which case, the devices may share at least some of the components described herein (where the components may communicate via traces that are a part of one or more printed circuit boards (PCBs) within at least one of the devices). As described thus far, the audio source device 20 may be an optional device. In another aspect, the companion device 3 may be an optional device, such that at least some of the operations described herein may be performed by audio output device 2.

Each of the devices include one or more (electronic) components (elements). For example, the audio output device includes a controller 22, non-transitory machine-readable storage medium (which may be referred to herein as "memory") 23, a microphone 28, and a speaker 29. The companion device 3 includes a controller 11, memory 12, the microphone 6, the display 7, and a speaker 15. The audio source device 20 includes a controller 91, memory 92, a microphone 94, a display 95, and a speaker 96. In one aspect, each of the device's components may be a part of (or integrated) within (e.g., a housing of) each respective device. In another aspect, at least some of the components may be separate electronic devices that are communicatively coupled with its respective device. For instance, speaker 29 of the audio output device may be integrated within a separate housing of the audio output device. In some aspects, at least one of the devices may include more or less components shown herein. For instance, the audio output device may include two or more microphones and two or more speakers. As another example, the companion device may not include a display.

Each of the controllers may be a special-purpose processor such as an application-specific integrated circuit (ASIC), a general-purpose microprocessor, a field-programmable gate array (FPGA), a digital signal controller, or a set of hardware logic structures (e.g., filters, arithmetic logic units, and dedicated state machines). Each of the controllers may be configured to perform digital (audio) signal processing operations and/or networking operations, as described herein. For instance, the controller 11 may be configured to determine (estimate) sound exposure of a user based on an estimate of environmental noise attenuation at the audio output device. As another example, the controller 22 may be configured to perform (or operate in) one or more audio processing modes in order to attenuate or reduce a gain of sound (noise) of the acoustic environment that is perceived by the user. As described herein, one or more of these controllers may be configured to perform one or more computational operations. In one aspect, any of the controllers may perform any of the operations described herein. For example, controller 91 may perform (at least some of) the operations described herein that are performed by the controller 11. More about the operations performed by one or more of the controllers is described herein.

Each of the speakers may be an electrodynamic driver that may be specifically designed for sound output at certain frequency bands, such as a woofer, tweeter, or midrange driver, for example. In one aspect, the speaker 29 may be a "full-range" (or "full-band") electrodynamic driver that reproduces as much of an audible frequency range as possible. In one aspect, at least one of the devices may include "extra-aural" speakers, which are arranged to output sound into the acoustic environment, rather than "internal" speakers that are arranged to output (or direct) sound into a user's ear, such as speakers of in-ear headphones. Each of the microphones may be any type of microphone (e.g., a differential pressure gradient micro-electro-mechanical system (MEMS) microphone) that is configured to convert acoustical energy caused by sound wave propagating in an acoustic environment into a microphone signal. In some aspects, one or more of the microphones may be an "external" (or reference) microphone that is arranged to capture sound from the acoustic environment, while one or more of the microphones may be an "internal" (or error) microphone that is arranged to capture sound (and/or sense pressure changes) inside a user's ear (or ear canal). In one aspect, at least one of the devices may include at least one of each type of microphone. For example, in the case of the over-the-ear headset 2 illustrated in FIG. 1, the headset may include an internal microphone that is arranged to capture sound at or near the user's ear (e.g., within an ear cup of the headset), and may include an external microphone that is arranged to capture the noise that is preset within the acoustic environment.

Examples of non-transitory machine-readable storage medium may include read-only memory, random-access memory, CD-ROMS, DVDs, magnetic tape, optical data storage devices, flash memory devices, and phase change memory. The memory 23 includes an environmental noise attenuator 24, which is an application program that when executed by one or more processors (or the controller 22) of the audio output device performs digital (audio) signal processing operations (and/or modes) described herein to attenuate (or reduce) exposure of environmental noise (as perceived by the user 9 while is wearing the audio output device).

One of the audio signal processing modes may be ANC 26 (which may be referred to herein as "ANC mode") in which the attenuator 24 performs an ANC function that causes the speaker 29 produces anti-noise in order to reduce (and/or cancel) ambient noise that leaks into the user's ear(s) (e.g., through a seal formed between a portion (e.g., a cushion or ear tip of the) of the audio output device that is in contact with a portion of the user's head while the output device is worn) from the acoustic environment. The ANC includes one or more ANC filter(s) 71, which when applied to one or more microphone signals produces one or more anti-noise signals. In one aspect, the ANC filters may include one or more filter coefficients, which may be used to produce one or more ANC filters. In another aspect, the ANC filters may include a cascade of one or more linear filters, such as a low-pass filter, a band-pass filter, etc. In another aspect, the ANC filter may define (or include) filter characteristics, e.g., the ANC filter's cutoff frequency, with which the ANC determines (or produces) one or more ANC filters.

In one aspect, ANC function may be a feedforward ANC that is configured to generate an anti-noise signal based on sound captured by one or more reference microphones in the acoustic environment. Specifically, the ANC filter may be a feedforward ANC filter, e.g., a finite-impulse response (FIR) filter or an infinite impulse response (IIR) filter, with which the ANC uses to apply one or more microphone signals from the microphone 28 to produce the anti-noise. In another aspect, the ANC function may be a feedback ANC that is configured to generate an anti-noise signal based on sound captured by one or more error microphone signals. Specifically, the attenuator may receive one or more microphone signals from error microphones that are arranged to capture sound within (or adjacent to) the user's ear (canal), and apply the signals to a feedback ANC filter to produce the anti-noise signal. In some aspects, the ANC function may implement a combination of the feedforward and feedback ANC to produce the anti-noise.

In one aspect, the ANC 26 may be configured to perform adaptive feedforward and/or feedback ANC functions to adapt the ANC filters 71. For example, the feedforward ANC function may adapt one or more feedforward ANC filters according to an estimate of a secondary path transfer function that represents a travel path between the speaker 29 and the microphone 28. In some aspects, the ANC may use any type of adaptive algorithm, such as Least Means Squares (LMS), Recursive Least Squares (RLS), etc.

In one aspect, the ANC 26 includes an ANC gain 72, which may be a scalar (wideband) gain block that is configured to raise (or lower) a level of the produced anti-noise (signal). In another aspect, the gain 72 may be configured to adjust one or more frequency bands, such as boosting or attenuating a low frequency band, when applied to the anti-noise signal. Thus, when performing ANC, the audio output device may adapt or configure the ANC filter(s) 71 and/or the ANC gain 72 in order to achieve a particular level of noise level attenuation when the anti-noise is produced (as a result of the applied filter(s) and/or gain) by the audio output device.

Another audio signal processing mode may be an ambient sound enhancement (ASE) mode ("pass-through" or "transparency" mode) 27 in which the attenuator uses the speaker 29 to pass one or more sounds of the acoustic environment through the audio output device. Specifically, the attenuator may apply one or more ASE filters 73 upon one or more (e.g., reference) microphone signals captured by microphone 28 that includes sounds from the acoustic environment to produce one or more (ASE) filtered audio signals, which include one or more of the captured sounds. When the filtered audio signals are used to drive the speaker 29, the sounds of the acoustic environment are reproduced in a "transparent" manner as perceived by the user, e.g., as if the audio output device were not being worn by the user. Thus, referring to FIG. 1, ASE may allow at least a portion of the noise produced by noise source 4 to pass through the headset 2, or more specifically through an ear cup or cushion of the headset, to be heard by the user 9. In one aspect, the ASE function is configured to obtain a reference microphone signal, which may include ambient sound, from the reference microphone 28, and filter the signal to reduce acoustic occlusion due to the (e.g., cushion of the over-the-ear) audio output device covering (at least a portion of) the user's ear. In one aspect, the ASE may produce a filtered signal in which at least one sound of the ambient environment is selectively attenuated, such that the attenuated sounds are not reproduced by the speaker 29. In one aspect, the ASE may fully attenuate (e.g., duck) one or more sounds, or the sounds may be partially attenuated such that an intensity (e.g., volume) of the sound is reduced (e.g., by a percentage value, such as 50%). For instance, the ASE may reduce a sound level of the microphone signal. In one aspect, the filter applied by the ASE may be composed of a cascade of digital filters that spectrally shape the ambient sound pickup channel for purposes of different types of noise suppression, e.g., microphone noise, background noise, and wind. In addition, the cascade of digital filters may include blocks that perform dynamic range compression and spectral shaping. In some aspects, similar to the ANC gain, the ASE gain 74 may be a scalar gain that is configured to raise (or lower) a level of the filtered audio signal.

In one aspect, the ASE filter(s) 73 may also preserve the spatial filtering effect of the wear's anatomical features (e.g., head, pinna, shoulder, etc.). In one aspect, the filter may also help preserve the timbre and spatial cues associated with the actual ambient sound. In one aspect, the filter may be user specific according to specific measurements of the user's head. For instance, the system may determine the filter according to a head-related transfer function (HRTF) or, equivalently, head-related impulse response (HRIR) that is based on the user's anthropometrics.

Another example of an audio processing mode may include a combination of the ANC function and the ASE function. Specifically, the attenuator may be configured to produce one or more anti-noise signals and/or one or more ASE filtered signals, which when used to drive the speaker 29 may attenuate at least some ambient noise and/or pass-through one or more ambient noises. In another aspect, the attenuator may include a passive attenuation audio processing mode, whereby the attenuator uses minimal (or no) audio signal processing (e.g., upon one or more microphone signals), and instead relies on the physical characteristics (e.g., an ear cushion of the audio output device) to passively attenuate at least some of the noise within the acoustic environment. In one aspect, while in the passive attenuation mode, the headset may not perform (any) ANC functions, whereby anti-noise may be played back through one or more speakers 29 of the audio output device, nor perform the ASE function in which one or more sounds of the environment (picked up by the microphones 28) are played back through the speakers 29.

In one aspect, the environmental noise attenuator may be configured to adapt (or adjust) attenuation of the environmental noise exposure experienced by the user by using (and/or adjusting) one or more audio signal processing modes, described herein. In particular, the attenuator may be configured to operate in an (e.g., adaptive) environmental noise attenuation mode, whereby the attenuator 24 uses (and/or adjusts) one or more audio signal processing modes, described herein, in order to set (or define) headset noise exposure perceived by the user (e.g., to be equal to and/or less than a predefined threshold) based on the environmental noise. For example, the attenuator may be configured to determine the environmental noise exposure (noise level) of noise within the acoustic environment. In one aspect, the noise level (e.g., SPL value) may be determined based on one or more microphone signals captured by one or more (reference) microphones of the audio output device. The attenuator may be configured to determine a (desired) headset noise exposure (e.g., in-ear SPL) based on the environmental noise exposure. For instance, the attenuator may perform a table lookup into a data structure that associates headset noise exposures with environmental noise exposures. Referring to FIG. 1, the attenuator may determine that the headset noise exposure is 70 dB when the user is within an acoustic environment with a noise level of 85 dB. In one aspect, the associations in the data structure may be previously defined in a controlled environment (e.g., in a laboratory). In another aspect, the attenuator may use a (predefined) attenuation model, which outputs a desired headset noise exposure (level) in response to one or more inputs (e.g., noise level of ambient noise, etc.). In some aspects, the determination may be based on user input (and/or user noise exposure history). Upon determining the desired headset noise exposure, the attenuator may operate (or perform) one or more of the audio signal processing modes, as described herein. For instance, the attenuator may operate in the ANC mode to perform an ANC function (e.g., adapting one or more ANC filters 71 and/or setting the ANC gain 72), such that the noise level is reduced to the desired level.

In one aspect, the attenuator may (dynamically) adjust the audio processing operations, such as ANC operations, based on in-ear SPL readings. For instance, the attenuator may receive a microphone signal of an error microphone of the audio output device 2, and may determine the in-ear SPL based on the microphone signal. Based on the difference between the in-ear SPL and the noise level, the attenuator may adjust the one or more audio signal processing operations. In other aspects, the attenuator may be configured to determine which modes to operate in order to attenuate the environmental noise level to a desired level. For instance, the attenuator 24 may perform a (e.g., another) table lookup into a data structure that associates audio signal processing modes with desired headset noise exposures. In another aspect, the attenuator may use an attenuation (predefined) model (e.g., stored in memory 23) to determine which modes to operate. In particular, the attenuator may apply one or more inputs (e.g., the desired headset noise exposure, the environmental noise exposure, etc.) into the model, which outputs the operations (modes) in which the attenuator is to operate in order to achieve the desired headset noise exposure.

In one aspect, the environmental noise attenuator may adapt the attenuation while operating in the environmental noise attenuation mode differently. For instance, the attenuator may determine the amount of attenuation based on the environmental noise level (e.g., based on a percentage of the noise level). As a result, as the environmental noise level increases, the amount of attenuation to be applied by the headset may also increase. In one aspect, the adaptation may be proportional. In another aspect, the adaptation may be nonlinear, such as having a polynomial relationship.

In some aspects, the headset may be configured to adapt one or more (currently executing) audio processing operations in order to achieve a desired headset noise exposure. For example, the headset 2 may be operating in the transparency mode, whereby one or more sounds are passed through to the user. The attenuator may be configured to adapt the transparency operations (e.g., adapt one or more ASE filters 73 and/or the ASE gain 74) in order to achieve a desired noise exposure. As an example, upon determining that the environmental noise level is higher than a desired in-ear SPL, the attenuator may reduce the ASE gain 74 such that the sounds that are passed through are at least partially attenuated (or gain reduced).

In one aspect, the audio output device may be configured to operate in the environmental noise attenuation mode based on user input. In particular, the audio output device may include one or more input devices (e.g., a physical button, knob, graphical user interface (GUI) displayed on a display of the audio output device with one or more UI adjustable items, such as virtual knobs or sliders, etc.) that are arranged to activate (operate) in the mode in response to receiving user input (e.g., pressing of the physical button, etc.). In another aspect, the input device may be a separate electronic device that is communicatively coupled with the audio output device. For example, the audio source device may include a GUI displayed on the display 95 with one or more UI items, which when selected (e.g., when the user touches the item on the display, which may be a touch-sensitive display) may transmit a control signal (via the network 21) to the audio output device for the attenuator to active (operate) in the attenuation mode. In another aspect, the audio output device may receive user input through other known methods (e.g., through a voice command captured by the microphone 28).

In another aspect, the audio output device may be configured to automatically (e.g., without user interference) operate in the attenuation mode. For instance, the device may be configured to monitor the environmental noise exposure and/or the headset noise exposure, and determine whether either (or both) of the exposures are above one or more thresholds. For example, the environmental noise attenuator may determine that the noise level within the acoustic environment (using one or more microphone signals) may exceed a (predefined) threshold level. In response, the device may activate (and/or adapt) the attenuation mode (e.g., by operating in one or more of the audio processing modes 25) in order to reduce the exposure to the user. In some aspects, the attenuator may activate/deactivate one or more modes based on changing environmental conditions. For instance, once the user enters an acoustic environment with a reduced noise level (e.g., enters a quiet room), the attenuator may deactivate a mode, such as the attenuation mode in which the device was operating while the user was in a noisier environment (e.g., in response to the headset noise exposure dropping below the threshold and/or the environmental noise level dropping below (e.g., another) threshold).

Turning now to the companion device 3, the memory 12 of the device includes a noise exposure estimator 13 and an acoustic dosimetry application 14, which when executed by the controller 11 perform one or more operations as described herein. The noise exposure estimator is configured to estimate the (e.g., desired) headset noise exposure by the user 9 according to, for example the one or more audio signal processing modes in which the audio output device 2 is operating (e.g., in response to the environmental noise exposure of the acoustic environment). Specifically, the estimator is configured to determine a level of attenuation that is being (e.g., actively and/or passively) applied by the audio output device (e.g., due to the one or more audio signal processing modes in which the audio output device is operating), and estimate the headset (sound) exposure based on at least one of the level of attenuation and a noise level of noise within the acoustic environment. For example, the estimator may use (at least a portion) of data received from the audio output device to estimate the level of attenuation. In one aspect, the data may indicate which audio signal processing modes the audio output device is currently operating. In another aspect, the data may indicate device characteristics (e.g., whether the audio output device is an over-the-ear headset that has cushions that provide passive attenuation). To determine the exposure, the estimator may determine a difference between the estimated level of attenuation and the noise level (e.g., as described in FIG. 1). More about the operations performed by the estimator (e.g., the estimation of the level of attenuation) is described herein.

The acoustic dosimetry application 14 is configured to perform an acoustic dosimetry process based on the headset noise exposure that is estimated by the noise exposure estimator 13. The application may be configured to receive the headset noise exposure (from the estimator), and may perform one or more dosimetry operations with the received exposure. For instance, the application may present a notification to the user 9 based on the exposure. As an example, the application may display a (e.g., pop-up) notification on a display 7 of the companion device, indicating the headset noise exposure by the user, such as the notification including an in-ear sound pressure level (SPL) value, such as 70 dB that is illustrated in FIG. 1. As a result, the companion device may be configured to provide the user with a notification of the user's (actual) sound exposure (e.g., due to wearing the audio output device) based on an estimation of the noise attenuation performed by the audio output device. In another aspect, the dosimetry application may produce (generate or update) dosimetry data with the received headset noise exposure. For example, the dosimetry application may be configured to store one or more noise exposures (e.g., headset exposure and/or environmental exposure), as SPL levels for example, and use one or more stored exposures to generate dosimetry data. For example, the dosimetry application may use one or more headset noise exposures to determine an average exposure (e.g., over a period of time), and may present the average to the user. In particular, the application may determine and prevent an average SPL level. As another example, the dosimetry application may keep track of geolocation information of the companion device (e.g., using GPS data retrieved by the companion device) with the exposures to identify (e.g., average) noise levels within particular locations. As a result, the dosimetry application may display (or monitor) noise exposures for a particular location at which the user is located. In some aspect, the dosimetry application may be configured to alert the user when the noise exposure exceeds a (e.g., predefined) threshold. More about the acoustic dosimetry application is described herein.

Turning now to the (optional) audio source device, the memory has an acoustic dosimetry application 93, which when executed by the controller 91 may be configured to perform an acoustic dosimetry process, which may be similar (or the same) as the process performed by the application 14 of the companion device 3. In one aspect, the application 93 may be configured to receive dosimetry data from the application 14, such as the estimated sound exposure, via the network 21. In which case, the audio source device may be arranged to display a notification on the display 95, indicating the exposure to the user. In some aspects, both devices may display (e.g., independently) the headset noise exposure, as described herein. More about the operations performed by the audio source device is described herein.

Figure 3:
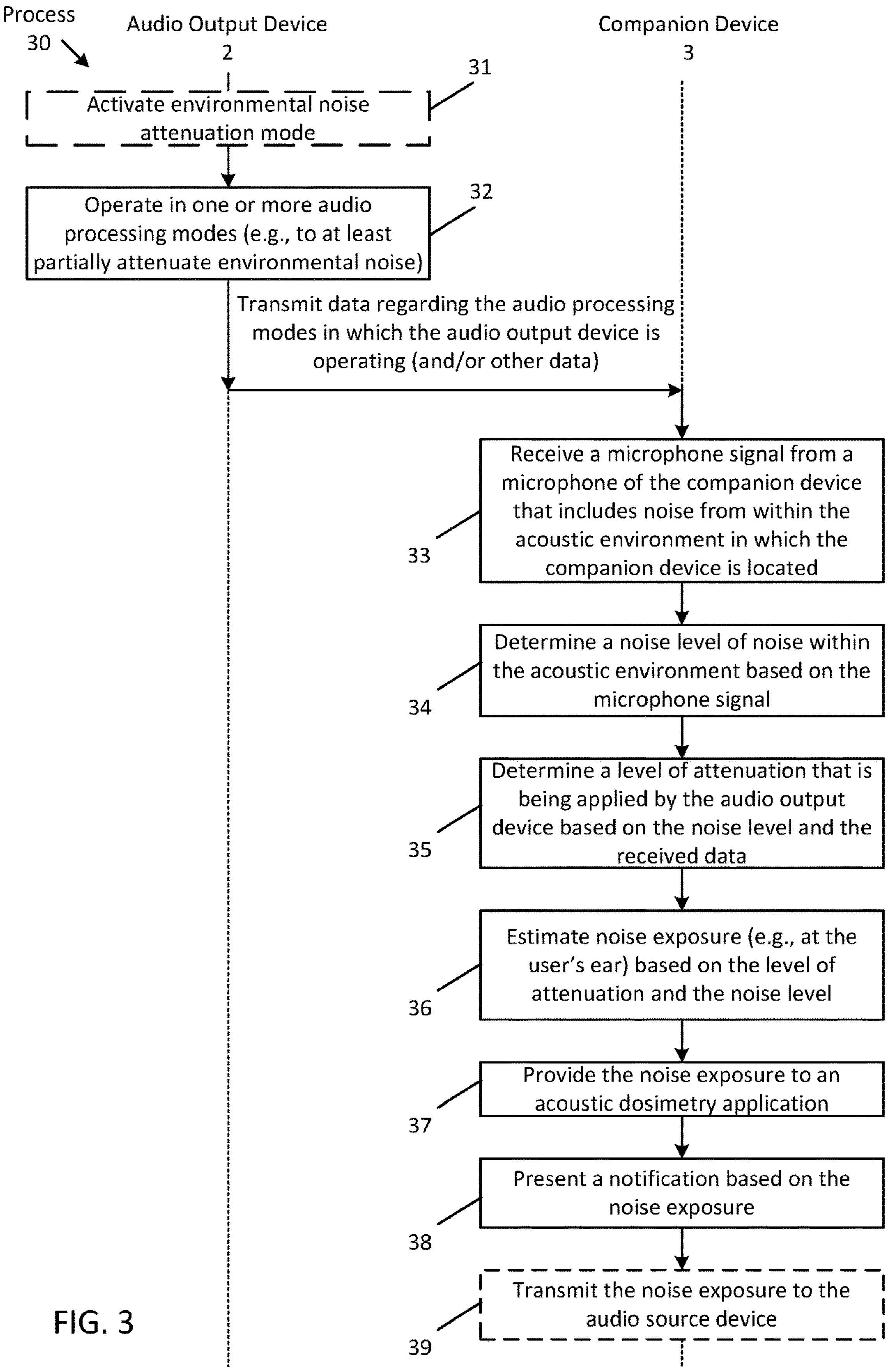
FIG. 3 is a signal diagram of one aspect of a process that is at least partially performed by a companion device and an audio output device for determining and presenting a user's sound exposure based on an estimate of environment noise attenuation of an audio output device that is being worn by the user.

FIG. 3 is a signal diagram of one aspect of a process 30 that is at least partially performed by a companion device 3 and an audio output device 2 for determining and presenting a user's noise exposure based on an estimate of environment noise attenuation by the audio output device that is being worn by the user. In particular, at least a portion of the process 30 may be performed by the (e.g., environmental noise attenuator 24 of the) controller 22 of the audio output device 2 and/or at least a portion of the process may be performed by (e.g., the noise exposure estimator 13 and/or the acoustic dosimetry application 14 of the) controller 11 of the companion device 3. The process 30 begins by the controller 22 activating (or entering) the environmental noise attenuation mode (at block 31). For example, the audio output device may receive user input to activate the mode, such as the user selecting a UI item in a GUI displayed on the display 7 of the companion device 3 in order for the system to adapt one or more audio signal processing operations performed by the audio output device to achieve a (e.g., desired) in-ear noise exposures. In one aspect, this block may be optional, which may be the case when the environmental noise attenuation mode is already activated. In another aspect, this block may be optional in the case in which this attenuation mode may not be available in the audio output device 2.

The controller 22 operates in one or more audio processing modes, for example to at least partially attenuate environmental noise (at block 32). Specifically, the attenuator 24 may operate in a mode, such as the ANC (mode) 26 in order to reduce (at least some) of the environmental noise that leaks into the user's ear (e.g., through a seal between the audio output device and at least a portion of the user's head). In one aspect, the controller may operate in the audio processing mode in response to the attenuation mode being activated (e.g., by user input). In another aspect, the attenuation mode may be activated automatically (e.g., without user intervention). For instance, the audio output device may monitor a noise level of a microphone signal captured by a microphone of the audio output device. In response to the noise level exceeding a threshold, the audio output device may activate the attenuation mode. In which case, the controller 22 may operate in an audio processing mode in order to compensate (or reduce) environmental noise (e.g., when the noise exceeds a threshold), as described herein. In particular, the attenuator 24 (of the controller 22) may define one or more operations of the mode (e.g., ANC operations, while in the ANC mode) in order to define (or set) the headset noise exposure perceived by the user (e.g., increasing a level of anti-noise by boosting the ANC gain 72 in order to reduce the noise level of the environmental noise perceived by the user).

As shown in this figure by block 31 having a dashed boundary, the operations of this block may be optional. In which case, the audio output device may operate in the one or more audio processing modes in response to user input. For example, the controller may receive user input (e.g., a selection of a physical button of the audio output device that controls the ANC 26). In response, the controller 22 may be configured to produce anti-noise, as described herein. Thus, the performance of one or more processing modes may be in response to user input.

The (controller 22 of the) audio output device 2 transmits (e.g., over the network 21, such as via a BLUETOOTH communication link) data regarding the audio processing modes in which the audio output device is operating (and/or other data) to the companion device 3. Specifically, the audio output device may transmit an indication of which one or more audio signal processing operations are being performed by the audio output device, such as an indication that the ANC mode (and/or transparency mode) is being performed by the audio output device. In addition to (or in lieu of) transmitting the indication of which mode the audio output device is operating, the output device may transmit one or more characteristics of that mode, such as (e.g., coefficients of) the ANC filter 71 with which the ANC 26 is using to produce the anti-noise and/or the ANC gain 72 that is being applied to the anti-noise signal (in order to boost or reduce the anti-noise being produced by the speaker 29), etc. In another aspect, the controller 22 may transmit data that may indicate device characteristics of the audio output device, such as a make and model of the audio output device, whether the audio output device is in-ear, on-ear, over-ear, and/or physical characteristics of the device, such as whether the device includes ear cushions that are placed on (and/or over) the user's ears or ear tips that go inside the user's ear canal to create an acoustic seal while worn by the user. As another example, the controller may transmit data that indicates whether the audio output device is capable of operating in (and/or is currently operating in) the environmental noise attenuation mode. In another aspect, the data may indicate other characteristics of the audio output device. For instance, the data may indicate that the audio output device establishing a wireless connection (e.g., BLUETOOTH link) with the companion device (and/or another device, such as the audio source device).

In some aspects, the audio output device 2 may transmit audio playback data to the companion device 3. For instance, the audio output device may be playing back user-desired audio content (e.g., music) by using one or more input audio signals that include (at least a portion of) the audio content to drive the speaker 29. In which case, the audio output device may transmit data relating to the audio content being played back. For example, the audio output device may transmit a playback sensitivity of (e.g., the speaker(s) 29 of) the audio output device, which defines sound pressure output as a function of an input audio signal (e.g., one or more driver signals used to drive the speakers 29). In one aspect, the playback sensitivity may be audio output device specific, where different output device may have different sensitivities. In one aspect, the sensitivity may be a gain value, which may be stored in memory 23.

In another aspect, the audio output device 2 may transmit other information relating to the playback, such as whether the content is a musical composition, data regarding the audio content may include playback duration, title of the composition, etc. In another aspect, the playback data may include a (user-defined) volume level (or the actual sound level) at which the audio content is being played back. In some aspects, the audio output device may transmit (at least a portion) of the (e.g., audio signal of the) audio content that is being played back.

In one aspect, (at least a portion of) the data may be transmitted based on one or more criteria. For instance, the data may be transmitted in response to the audio output device establishing a wireless connection with the companion device (and/or with another device). As another example, the audio output device may transmit data periodically (e.g., every second, minute, etc.). In another aspect, data may be transmitted in response to changes to the audio output device (e.g., due to user input), such as changing from one audio processing mode to another (e.g., changing from ANC mode to transparency mode).

In one aspect, the data transmitted by the audio output device may not include an in-ear SPL reading at (or near) the user's ear. In particular, the data may not indicate an actual headset noise level at or near the user's ear, which may be determined by the audio output device based on one or more microphone signals captured by one or more error microphones of the audio output device. In another aspect, the data may not include (any) microphone data captured by the one or more (e.g., error and/or reference) microphones of the audio output device. For instance, the data that is transmitted (e.g., an indication of which audio processing mode the audio output device is operating) may be a minimal amount (e.g., below a threshold) of data (e.g., for wireless transfer), with respect to the microphone data that is captured by one or more microphones of the audio output device. By limiting the amount of data that is transmitted by the audio output device, the system 1 may reduce the data transfer rate between the two devices. This may be beneficial when bandwidth of the communication link between the two devices is limited. In addition, by minimizing the amount of data transfer, the system may reduce overall latency for estimating environmental noise attenuation performed by the companion device and for the acoustic dosimetry application to measure noise exposure, as described herein. For example, the audio output device may aggregate data over a period of time, and transmit the data as one or more data packets (e.g., IP data packets). By reducing the amount of data, the system may aggregate less data over a lesser period of time, thereby providing the data to the companion device quicker than if additional data were needed. As a result, the system may be configured to estimate the environmental noise exposure and/or estimate the noise exposure faster (e.g., within a time period) and therefore provide the user with more up-to-date notifications relating to noise exposure.

Turning now to the companion device 3, the (e.g., noise exposure estimator 13 being executed by the) controller 11 may receive a microphone signal from microphone 6 that includes noise from within the acoustic environment in which the companion device (and/or the audio output device) is located (at block 33). In one aspect, the controller may receive the microphone signal in response to receiving the data from the audio output device. For example, in response to receiving the data indicating that the audio output device has established a wireless communication link with the companion device (and/or in response to determining that the audio output device is operating in one or more audio processing modes), the companion device may activate a (reference) microphone 28 to cause the microphone to (begin) capturing sound/noise of the acoustic environment as a microphone signal. The controller 11 may determine a noise level of the noise within the acoustic environment based on the microphone signal (at block 34). In particular, the controller may determine the (e.g., SPL) noise level of the microphone signal, which may represent the environment noise exposure (due to noise within the acoustic environment in which the user is located).

The controller 11 determines a level of attenuation that is being applied (or caused) by the audio output device based on the determined noise level and (at least a portion of) the received data (at block 35). Specifically, the controller may determine the level of active and/or passive attenuation by the output device using the noise level and at least some data, such as the indication of which mode(s) the output device is (currently) operating. For example, the controller may perform a table lookup into a data structure that associates levels of attenuation with data (e.g., which audio processing mode the output device is operating, whether the audio output device is in the environmental noise attenuation mode, etc.) with respect to the noise level. In particular, the data structure may be predefined in a controlled environment (e.g., a laboratory), in which attenuation levels are determined based on various conditions/criteria of the audio output device. For example, the level of attenuation applied by the audio output device when in the attenuation mode and applying ANC while in a particular environmental noise exposure may be predefined. Thus, the level of attenuation may be based on an indication of which (of one or more) audio processing operations modes (e.g., the ANC mode and/or ASE mode) the audio output device is operating. For example, the level of attenuation may be high (e.g., above a threshold) upon a determination that the audio output device is operating in the ANC mode. In another aspect, the level of attenuation may be lower (e.g., below the threshold) upon a determination that the audio output device is in the ASE, pass-through, mode.

In one aspect, the level of attenuation may change based on changes to the noise level. For example, as the noise level decreases, the level of attenuation may decrease. In one aspect, the level of attenuation and the noise level has a linear relationship. In another aspect, the levels may have a non-linear relationship (e.g., having a parabolic relationship). In some aspects, the noise exposure estimator 13 may apply the data and the noise level to an environmental noise attenuation model (which may be predefined), which in response outputs the level of attenuation applied by the audio output device.

The controller 11 estimates (headset) noise exposure (e.g., at the user's ear) based on the level of attenuation and the noise level (at block 36). In particular, the noise estimator 13 may determine the exposure based on a difference between the noise level and the level of attenuation. For example, referring back to FIG. 1, the noise estimator may determine that the attenuated level is 15 dB based at least in part on the environmental noise level of 85 dB, with the difference between the two levels being 70 dB. The controller provides the noise exposure to the acoustic dosimetry application 14 (at block 37). In particular, the noise exposure estimator 13 may provide the noise exposure and/or additional information, such as the environmental noise exposure of the user. In another aspect, the estimator may provide at least some of the data from the audio output device, such as the mode in which the device is operating and whether the audio output device is operating in the attenuation mode.

The controller 11 presents a notification based on the noise exposure (at block 38). Specifically, the acoustic dosimetry application 14 may display the noise exposure in a GUI associated with the acoustic dosimetry application on the display 7 as a SPL value (e.g., in dB), where the value represents the in-ear SPL experienced by the user. As another example, the dosimetry application may display a graphical representation of the noise exposure. For instance, the application may display a color gradient, where certain colors represent a particular SPL valve. In which case, some colors may represent one or more thresholds. In another aspect, the acoustic dosimetry application may display other information, such as the environmental noise exposure (in order to provide the user with a comparison between the noise within the environmental and the noise that is being perceived by the user). In another aspect, the dosimetry application may display other dosimetry data, as described herein.

The controller (optionally) transmits the noise exposure to the audio source device (at block 39). In which case, the acoustic dosimetry application 93 that is being executed by the controller 91 may perform one or more dosimetry operations, as described herein. For instance, the application may display a notification on the display 95 and/or keep track of the noise exposure (storing it as dosimetry data, as described herein).

Some aspects may perform variations to the process 30 described in FIG. 3. For example, the noise exposure may be estimated differently. For instance, the controller 11 may be configured to estimate the noise exposure based on the determined noise level and at least some of the received data. In which case, the controller may perform at least some of the same operations to determine the noise exposure (e.g., directly) from this information, rather than having to determine a difference between a determined level of attenuation and the noise level. For example, the controller may perform a table lookup into a data structure that associates (headset) noise exposures with noise levels and at least some of the data determined by the audio output device (e.g., one or more audio processing modes, etc.).

Figure 4:
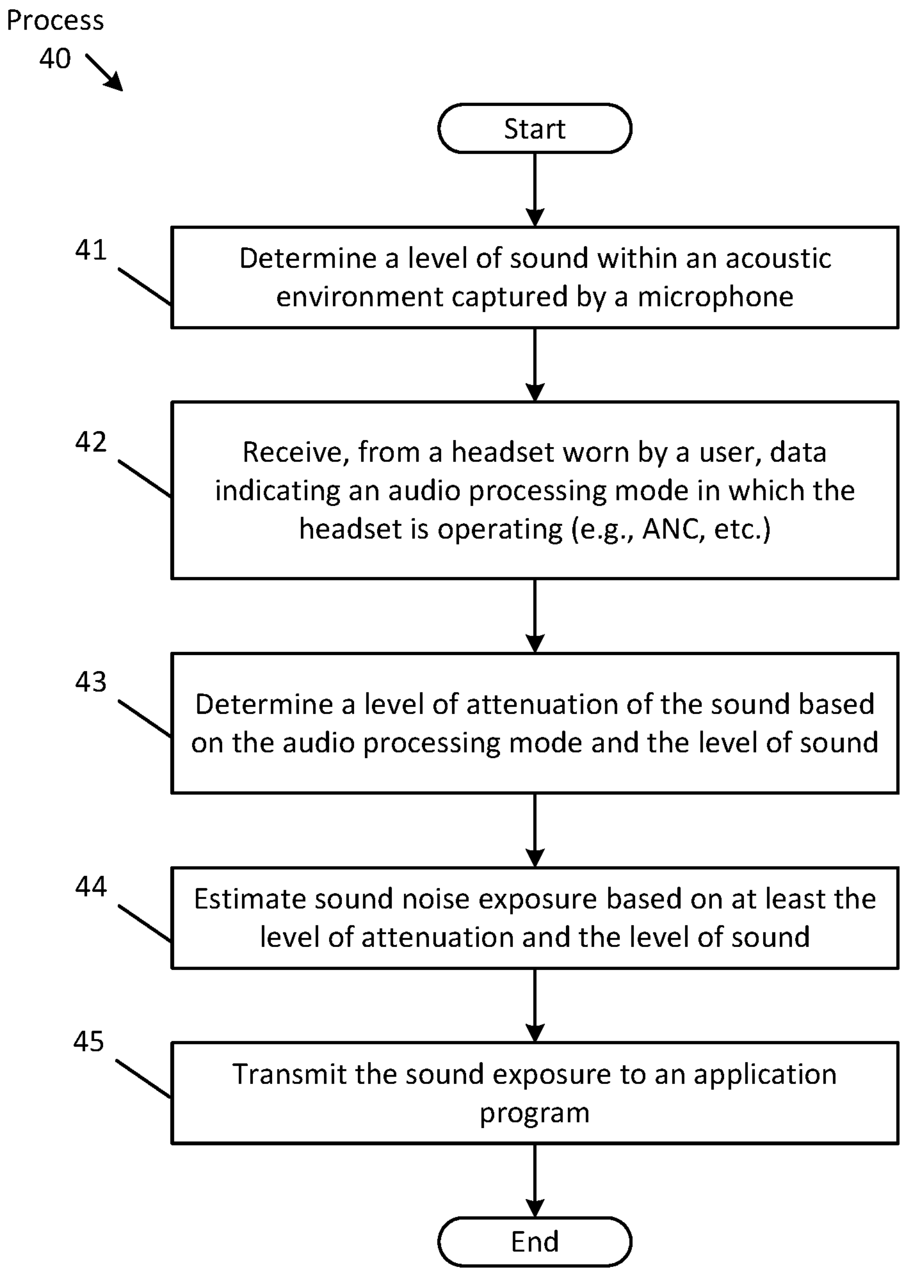
FIG. 4 is a flowchart of one aspect of a process for determining a sound exposure by a user based on an estimate of environmental noise attenuation.

FIG. 4 is a flowchart of one aspect of a process 40 for determining noise exposure of a user based on an estimate of environmental noise attenuation. In one aspect, the process 30 may be performed by the (e.g., noise exposure estimator 13 and/or acoustic dosimetry application 14 that are being executed by the) controller 11 of the companion device. For instance, the controller 11 may perform (at least some of the) operations while the companion device is being used and/or worn by the user (e.g., being worn on a wrist of the user when the device is a smart watch), and while the companion device is wirelessly communicatively coupled with an audio output device that is being worn by the user (e.g., over-the-ear or in-ear headset that is worn over or in the user's ears). The process 40 begins by the controller 11 determines a level of sound within an acoustic environment captured by a microphone (at block 41). Specifically, the level of sound may be the environmental noise exposure of the noise within the acoustic environment. The controller 11 receives, from a headset worn by a user, data indicating an audio processing mode in which the headset is operating, such as an ANC mode, a transparency mode, etc. (at block 42). As described herein, the data may include other information, such as playback information and device characteristics.

The controller determines a level of attenuation of the sound based on the audio processing mode and the level of sound (at block 43). In particular, the controller determines how much active and/or passive attenuation is applied (or caused by) the headset being worn by the user based on at least a portion of the received data. In one aspect, the noise exposure estimator 13 may perform a table lookup, as described herein, to determine the level of attenuation. The controller estimates the sound (or noise) exposure (perceived by the user) based on at least the level of attenuation and the level of the sound (at block 44). The sound exposure estimated by the controller is the headset (or in-ear) exposure perceived by the user, as described herein. This estimate may be a difference between the two levels. The controller transmits the exposure to an application program (at block 45). For instance, the estimator 13 may transmit the exposure to the acoustic dosimetry application 14 for storage and/or presentation to the user. As another example, the exposure may be transmitted to the dosimetry application 93 that is being executed by the audio source device.

Figure 5:
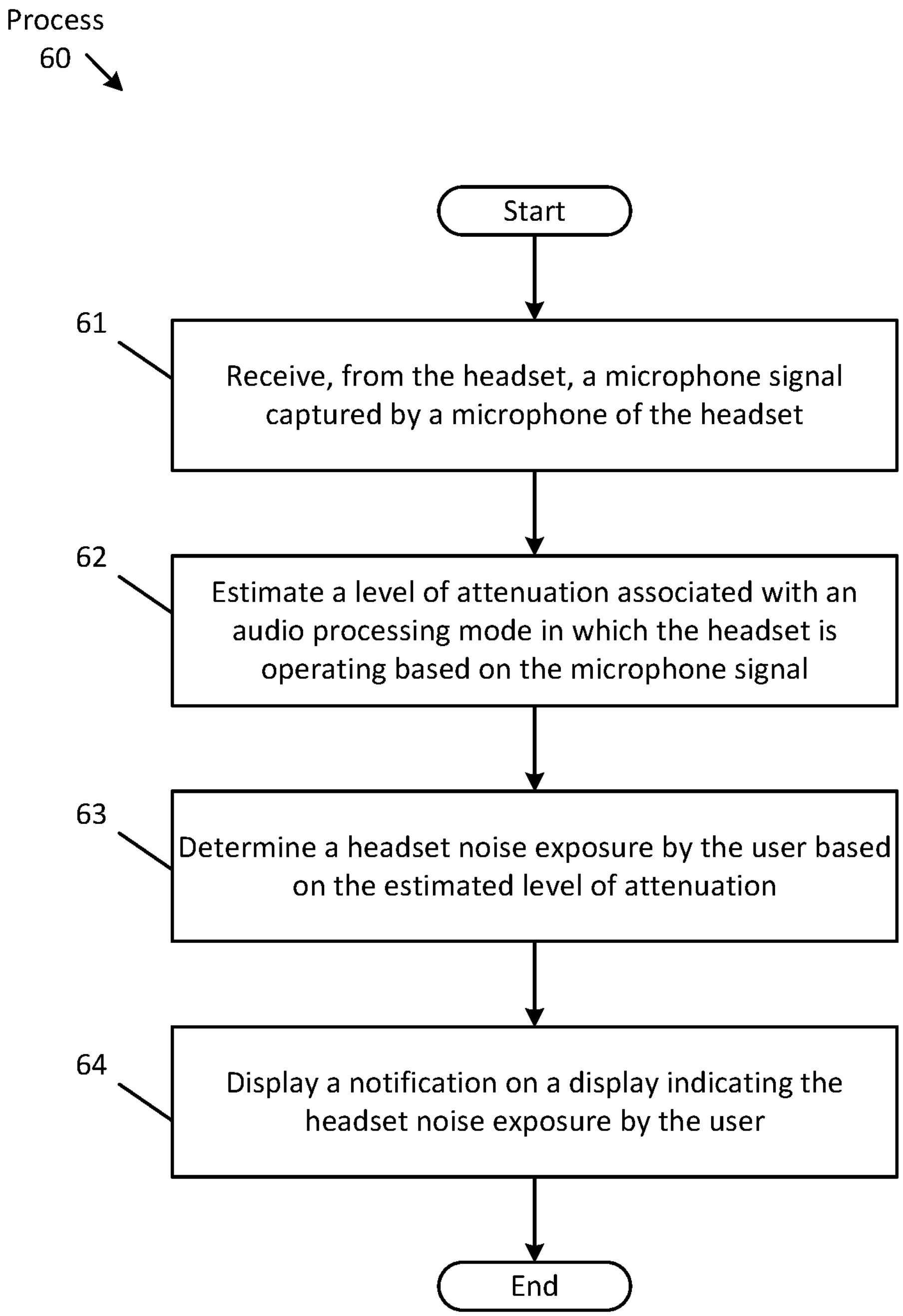
FIG. 5 is a flowchart of another aspect of a process for determining a noise exposure by the user based on an estimate of the environmental noise attenuation.

FIG. 5 is a flowchart of another aspect of a process 60 for determining a (headset) noise exposure by the user based on an estimate of the environmental noise attenuation. In particular, at least some of the operations may be performed by the controller 11 of the companion device 3. The process 60 begins with the controller receiving, from a headset that is being worn by the user, a microphone signal captured by a microphone of the headset (at block 61). In one aspect, the microphone signal may be captured by a reference microphone of the headset that is arranged to capture acoustic noise within the acoustic environment in which the user (and the headset) is located. In another aspect, the headset may transmit other data to the companion device 3, such as device characteristics of the headset and an indication of which of one or more modes the headset is operating, as described herein.

The controller 11 estimates a level of attenuation associated with an audio processing mode in which the headset is operating based on the microphone signal (at block 62). In particular, the controller may determine a noise level of the microphone signal that represents the environmental noise exposure, and using the noise level and an indication of which audio processing mode (based on the received data) may determine a level of attenuation (or gain reduction) that is applied (or caused by) the headset, as described herein. The controller may determine a headset noise exposure by the user based on the estimated level of attenuation (at block 63) The controller may display a notification on a display screen indicating the headset noise exposure by the user (at block 64). Thus, the companion device may be configured to estimate the level of attenuation by the headset being worn by the user, using a microphone signal captured and transmitted by the headset.

Some aspects may perform variations to the process 60 described in FIG. 5. For example, the headset may transmit an in-ear SPL reading measured by the audio output device, with which the companion device may use to determine the headset noise exposure. In particular, the audio output device may use a (error) microphone 28 that is arranged to capture sound at or near the user's ear to produce a microphone signal, and from the signal determine the in-ear SPL heading (e.g., as a signal level of the microphone signal). This in-ear SPL may define the headset noise exposure. In which case, the companion device may omit the operations performed in block 62, and upon determining the headset noise exposure from the headset may display the exposure in the notification. In another aspect, the companion device may determine the in-ear SPL from the microphone signal captured by the headset. In this case, the headset may transmit (at least a portion) of a microphone signal captured by an error microphone of the headset to the companion device, which may use the microphone signal to determine the headset noise exposure of the user.

Figure 6:
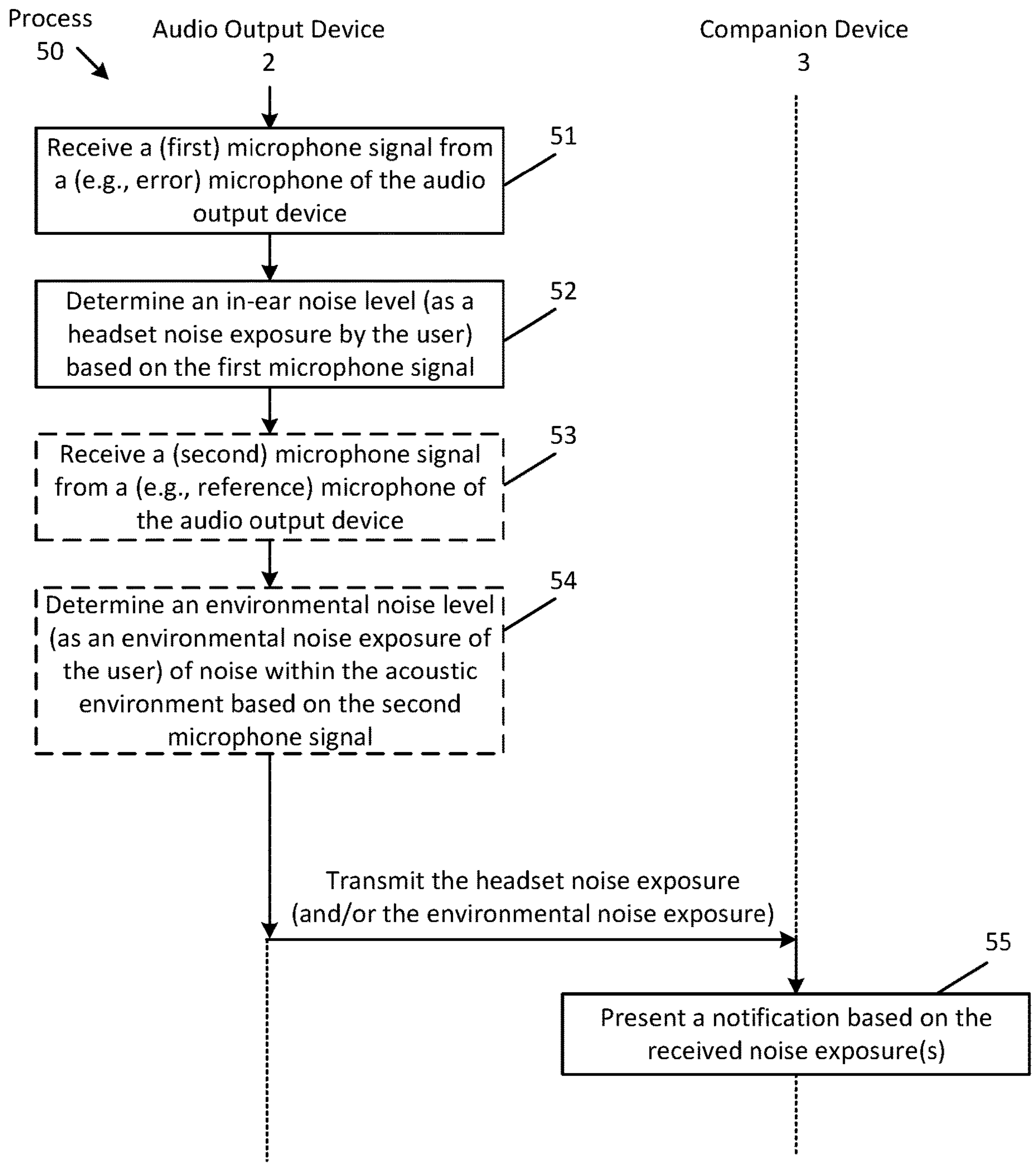
FIG. 6 is another signal diagram of one aspect of a process that is at least partially performed by a companion device and an audio output device for determining and presenting a user's sound exposure based on an estimate of environment noise attenuation of an audio output device.

As described thus far, the companion device 3 may be configured to estimate the environmental noise attenuation of the audio output device in order to determine the headset noise exposure of the user. In another aspect, at least some of these operations may be performed by another electronic device, such as the audio output device. FIG. 6 is another signal diagram of one aspect of a process 50 that is at least partially performed by the companion device 3 and the audio output device 2 for determining and presenting a user's noise exposure based on an estimate of environment noise attenuation of the audio output device. In one aspect, at least some of these operations may be performed while the audio output device is operating in one or more of the modes described herein (e.g., the ANC mode, etc.).

The process 50 begins by the controller 22 receiving a (first) microphone signal from a microphone of the audio output device (at block 51). For instance, the controller may receive a microphone signal captured by an error microphone of the audio output device. In one aspect, the audio output device may receive the microphone signal in response to (beginning to or enabling) one or more of the modes described herein. For example, upon activating the environmental noise attenuation mode, the audio output device may activate an error microphone of the audio output device that is arranged to capture in-ear noise of the user. The controller determines an in-ear noise level (as a headset noise exposure by the user) based on the first microphone signal (at block 52). In one aspect, the in-ear level may be (e.g., an overall) SPL value based on a signal level of the first microphone signal that represents the in-ear noise exposure by the user. In another aspect, the controller 22 may take into account audio playback by the audio output device when determining the in-ear noise level. In particular, during audio playback, the in-ear level may result in a sound level of the audio playback in combination with a noise level of noise that leaks into the user's ears. In which case, the controller 22 may account for the audio playback and determine the noise level as representing only (or the majority of) the noise from the environment that leaks into the user's ears. In some aspects, the controller 22 may subtract an input audio signal of the audio content that is being used to drive the speaker 29 from the first microphone signal to produce an in-ear noise audio signal from which the in-ear noise level is determined. In another aspect, the controller may account for the audio playback by combining the sound level of the playback with the estimated noise level. As a result, the in-ear noise level may be a combination of the audio playback and the environmental noise that leaks into the user's ears.

The controller 22 may (optionally) receive a (second) microphone signal from a (e.g., reference) microphone of the audio output device, such that the second microphone signal includes noise from the acoustic environment (at block 53). The controller 22 (optionally) determines a noise level of noise within the acoustic environment (as an environmental noise exposure by the user, as if the user were not wearing the audio output device) based on the second microphone signal (at block 54).

The controller 22 transmits the headset noise exposure (and/or the environmental noise exposure), as SPL value(s), to the companion device. The controller 11 receives the noise exposure value(s), and presents a notification based on the received noise exposure(s) (at block 55). For example, the companion device may receive both noise exposures and display them for the user in order to show how much the headset reduces the overall environmental noise.

Some aspects may perform variations to the process 50 described in FIG. 6. For example, the audio output device 2 may be configured to present the notification to the user. In particular, the controller 22 may be configured to produce a notification audio signal that includes an audible notification, which when used to drive the speaker 29 alerts the user of the noise exposure. For example, the audio output device may output a notification, such as "Your noise exposure is 70 decibels". This may be beneficial in that the system may only require a user to having one device, such as the audio output device, to provide the user with notifications of headset noise exposure and/or environmental noise exposure without a companion device (e.g., smart watch).

As described thus far, the system 1 may be configured to estimate and present noise exposure information. In particular, the system may perform at least some of these operations in real-time, such that the system may present a noise exposure value that is currently being perceived by the user. In another aspect, the system may be configured to aggregate noise exposure over a period of time and may be configured to report the cumulative exposure. The cumulative exposure may include noise exposure (e.g., headset and/or environmental noise exposure) while accounting for any sound attenuation that are provided by headphones worn by the user. For example, the system may report one or more exposure values, such as an average, maximum and/or minimum headset noise exposure or an average, maximum and/or minimum environmental noise exposure. As another example, the system may report combined exposure values, such as an average noise level, minimum noise level, maximum noise level over the period of time, where the noise level may represent both in-ear and environmental noise levels. The controller 22 of the audio output device may be configured to perform at least some of the operations described herein (e.g., in process 50) to estimate noise exposure, such as the in-ear noise level, over a period of time, and store noise exposure values (e.g., over a period of time) in memory 23. In which case, the audio output device 2 may transmit average values, maximum values, and/or minimum values (e.g., periodically and/or each time the controller 22 performs the noise exposure estimate). As another example, the system 1 may estimate other data, such as environmental noise level over a period of time. The controller 22 may produce an overall noise exposure level by combining the in-ear noise level, the environmental noise level and attenuation information (e.g., a level of attenuation, which attenuation mode was used, how long the mode was used, etc.).

In one aspect, the system 1 may be configured to aggregate noise levels based on the noise and/or environment in which the user is located. In particular, the system may be configured to determine a location or environment in which the user is located (e.g., based on geolocation data captured by one or more devices of the system), and may be configured to estimate noise levels while the user is at that location and present the levels to the user. For example, the system 1 may be configured to determine that the user is at a stadium, to aggregate headset noise exposure perceived by the user while at the stadium, and present at least a portion of the aggregated data to the user.

As described herein, audio playback by the audio output device may be taken into account when estimating a headset noise level. In one aspect, the system 1 may be configured to capture and log sound exposure of the audio playback and/or the noise as perceived by the user. For instance, controller 22 of the audio output device 2 may be configured to estimate a sound output level of audio content that is being played back by the speaker 29. In particular, the controller may determine the sound output level based on one or more audio signals that are being used to drive the speaker and/or based on a microphone signal captured by an error microphone of the audio output device. The controller may determine the in-ear noise level based on a difference between a measured noise level of the acoustic environment and a level of attenuation of the audio output device due to one or more audio processing modes that the audio output device is executing. In which case, the controller 22 may determine the headset noise level (or exposure) as a combination of the sound output level and the in-ear noise level. In one aspect, the sound exposure may be presented by the system 1. In particular, the audio output device may playback an audible notification that may include the sound output level during audio playback and/or the headset noise exposure. In one aspect, the audio notification may indicate a cumulative sound exposure of both the sound output level and the noise level.

As described thus far, at least some of the operations for estimating the level of attenuation and displaying a notification based on an estimated noise exposure may be performed by the companion device 3. In another aspect, the operations may be performed by the audio source device. For example, referring to FIG. 3, the operations performed by the companion device 3 in process 30 may be (at least partially) performed by the controller 91 of the audio source device 20. In which case, the controller 91 may estimate the noise exposure based on the level of attenuation and the noise level, and may provide the noise exposure to the acoustic dosimetry application 93 to be presented in a notification on the display 95. In addition, the audio source device 20 may transmit the noise exposure to the companion device 3 for display.

In another aspect, at least some of the operations performed by the companion device 3 may instead by performed by the audio output device 2. Specifically, referring back to FIG. 3, the controller 22 of the audio output device 2 may perform at least some of the operations of process 30. For example, the controller 22 may determine the noise level of the noise within the acoustic environment based on the microphone signal captured by the (e.g., reference) microphone 28. The controller 22 may determine a headset noise exposure by a user of the headset based on an audio processing mode in which the headset is operating and the noise level. For instance, the controller may determine a level of attenuation of the noise due to the headset operating in the audio processing mode. The controller 22 may determine the level of attenuation that is being applied by the (e.g., one or more audio processing modes of the) audio output device based on the noise level and the mode(s) in which the audio output device is operating. The controller 22 may estimate the noise exposure based on the level of attenuation and the noise level (e.g., being the difference between the noise level and the level of attenuation), and may cause the audio output device to provide the noise exposure (and/or the environmental noise exposure) to the companion device. In particular, the headset may transmit the noise exposure to an application (e.g., by transmitting the exposure via a wireless connection to the companion device that may be executing the application).

As described herein, the system may be configured to aggregate noise exposure over a period of time and may be configured to report the cumulative exposure. For example, the audio output device may retrieve, from memory of the audio output device, one or more headset noise exposure that were previously determined over a period of time (e.g., prior to estimating a current noise exposure value). The audio output device may produce an average noise exposure using at least some of the previously determined exposures and a last determined exposure, and may transmit this average to an application (e.g., for presentation to the user).

According to one aspect of the disclosure, an electronic device including: a microphone; at least one processor; and memory having instructions stored therein which when executed by the at least one processor causes the electronic device to: determine a level of sound within an acoustic environment captured by the microphone; receive, from a headset worn by a user, data indicating an audio processing mode in which the headset is operating, determine a level of attenuation of the sound based on the audio processing mode and the level of sound, estimate sound exposure based on at least the level of attenuation and the level of sound; and transmitting the sound exposure to an application.

In one aspect, the electronic device further includes a display, the application is being executed by the at least one processor and is configured to display a notification based on the sound exposure on the display. In another aspect, the electronic device is a smart watch. In some aspects, the notification comprises an in-ear sound pressure level (SPL) value. In one aspect, the audio processing mode is an active noise cancellation (ANC) mode in which one or more speakers of the headset is producing anti-noise, wherein the level of attenuation is based on an indication that the ANC mode is being performed by the headset. In another aspect, the audio processing mode is a pass-through mode in which the headset passes through a sound from within the acoustic environment using one or more speakers, wherein the level of attenuation is based on an indication that the pass-through mode is being performed by the headset.

In one aspect, the level of attenuation is determined in response to determining that the headset is in wireless communication with a separate electronic device and in response to determining that the headset is operating in the mode based on the received data, and transmitting the sound exposure comprises transmitting, over a wireless communication link, the sound exposure to the separate electronic device on which the application is being executed. In another aspect, the level of sound is a first level of sound, and the level of attenuation is a first level of attenuation, the memory has further instructions to: determine a second level of sound within the acoustic environment captured by the microphone; and determine a second level of attenuation based on the mode and the second level of sound, wherein the second level of attenuation is different than the first level of attenuation.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

As previously explained, an aspect of the disclosure may be a non-transitory machine-readable medium (such as microelectronic memory) having stored thereon instructions, which program one or more data processing components (generically referred to here as a "processor") to perform the network operations and audio signal processing operations, as described herein. In other aspects, some of these operations might be performed by specific hardware components that contain hardwired logic. Those operations might alternatively be performed by any combination of programmed data processing components and fixed hardwired circuit components.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A method performed by at least one programmed processor of an electronic device, the method comprising:

determining a level of ambient sound within an acoustic environment using a microphone signal captured by a microphone of the electronic device;

receiving, from a headset worn by a user, data indicating an audio processing mode in which the headset is operating and one or more device characteristics of the headset;

using the data, the one or more device characteristics, and the level of ambient sound to determine a level of attenuation for the ambient sound at an ear of the user caused by the headset that is worn by the user;

estimating sound exposure based on at least the level of attenuation and the level of ambient sound; and transmitting the sound exposure to an application program.

2. The method of claim 1, wherein the application program is being executed by the electronic device that is communicatively coupled with the headset, the application program configured to display a notification based on the sound exposure on a display of the electronic device.

3. The method of claim 2, wherein the notification comprises an in-ear sound pressure level (SPL) value.

4. The method of claim 1, wherein the electronic device is a wearable device that is being worn by the user while the headset is worn on a head of the user.

5. The method of claim 1, wherein the audio processing mode is an active noise cancellation (ANC) mode in which one or more speakers of the headset is producing anti-noise, wherein the level of attenuation is based on an indication that the ANC mode is being performed by the headset.

6. The method of claim 1, wherein the audio processing mode is a pass-through mode in which the headset passes through a sound from within the acoustic environment using one or more speakers, wherein the level of attenuation is based on an indication that the pass-through mode is being performed by the headset.

7. The method of claim 1, wherein the level of attenuation is determined in response to determining that the headset is in wireless communication with the electronic device and in response to determining that the headset is operating in the audio processing mode based on the received data, wherein transmitting the sound exposure comprises transmitting, over a wireless communication link, the sound exposure to the electronic device on which the application program is being executed.

8. The method of claim 1, wherein the level of ambient sound is a first level of ambient sound, and the level of attenuation is a first level of attenuation, wherein the method further comprises:

determining a second level of ambient sound within the acoustic environment captured by the microphone; and using the data indicating the audio processing mode, the one or more device characteristics, and the second level of ambient sound to determine a second level of attenuation, wherein the second level of attenuation is different than the first level of attenuation.

9. An electronic device comprising:

a microphone;

at least one processor; and memory having instructions stored therein which when executed by the at least one processor causes the electronic device to:

determine a level of ambient sound within an acoustic environment using a microphone signal captured by the microphone;

receive, from a headset worn by a user, data indicating an audio processing mode in which the headset is operating and one or more device characteristics of the headset;

use the data, the one or more device characteristics, and the level of ambient sound to determine a level of attenuation for the ambient sound at an ear of the user caused by the headset that is worn by the user;

estimate sound exposure based on at least the level of attenuation and the level of ambient sound; and transmit the sound exposure to an application program.

10. The electronic device of claim 9, wherein the application program is being executed by the electronic device that is communicatively coupled with the headset, the application program configured to display a notification based on the sound exposure on a display of the electronic device.

11. The electronic device of claim 10, wherein the notification comprises an in-ear sound pressure level (SPL) value.

12. The electronic device of claim 9, wherein the electronic device is a wearable device that is being worn by the user while the headset is worn on a head of the user.

13. The electronic device of claim 9, wherein the audio processing mode is an active noise cancellation (ANC) mode in which one or more speakers of the headset is producing anti-noise, wherein the level of attenuation is based on an indication that the ANC mode is being performed by the headset.

14. The electronic device of claim 9, wherein the audio processing mode is a pass-through mode in which the headset passes through a sound from within the acoustic environment using one or more speakers, wherein the level of attenuation is based on an indication that the pass-through mode is being performed by the headset.

15. A non-transitory machine-readable medium having instructions stored therein which when executed by at least one processor of an electronic device causes the electronic device to:

determine a level of ambient sound within an acoustic environment using a microphone signal captured by a microphone of the electronic device;

receive, from a headset worn by a user, data indicating an audio processing mode in which the headset is operating and one or more device characteristics of the headset;

use the data, the one or more device characteristics, and the level of ambient sound to determine a level of attenuation for the ambient sound at an ear of the user caused by the headset that is worn by the user;

estimate sound exposure based on at least the level of attenuation and the level of ambient sound; and transmit the sound exposure to an application program.

16. The non-transitory machine-readable medium of claim 15, wherein the application program is being executed by the electronic device that is communicatively coupled with the headset, the application program configured to display a notification based on the sound exposure on a display of the electronic device.

17. The non-transitory machine-readable medium of claim 16, wherein the notification comprises an in-ear sound pressure level (SPL) value.

18. The non-transitory machine-readable medium of claim 15, wherein the electronic device is a wearable device that is being worn by the user while the headset is worn on a head of the user.

19. The non-transitory machine-readable medium of claim 15, wherein the audio processing mode is an active noise cancellation (ANC) mode in which one or more speakers of the headset is producing anti-noise, wherein the level of attenuation is based on an indication that the ANC mode is being performed by the headset.

20. The non-transitory machine-readable medium of claim 15, wherein the audio processing mode is a pass-through mode in which the headset passes through a sound from within the acoustic environment using one or more speakers, wherein the level of attenuation is based on an indication that the pass-through mode is being performed by the headset.

* * * * *